Figure 1:
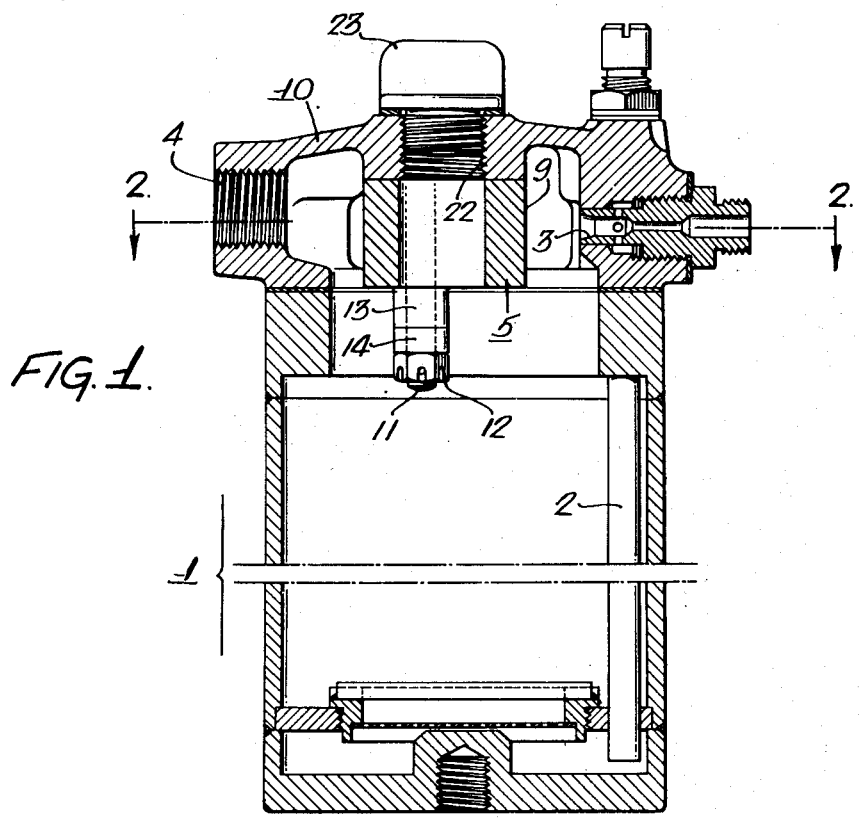

Sept. 16, 1952  K. E. A. GÖTHBERG  2,610,700
OIL MIST LUBRICATOR

Filed April 2, 1948  2 SHEETS—SHEET 1

Inventor:
Karl Evald Andreas Göthberg
by his Attorneys
Howson & Howson

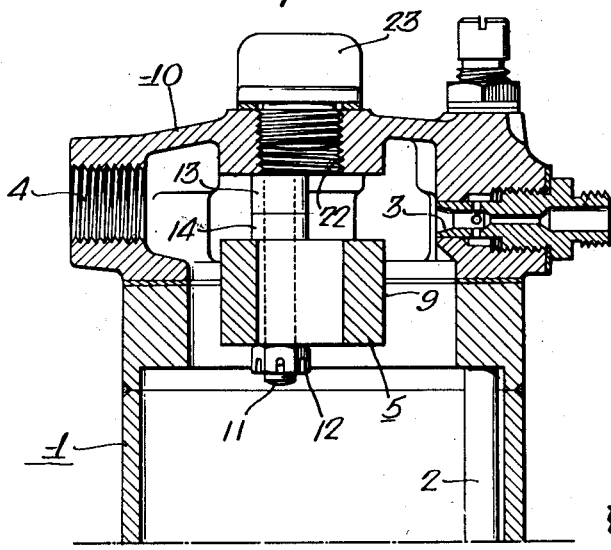
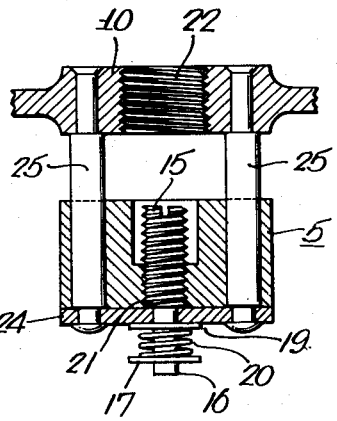
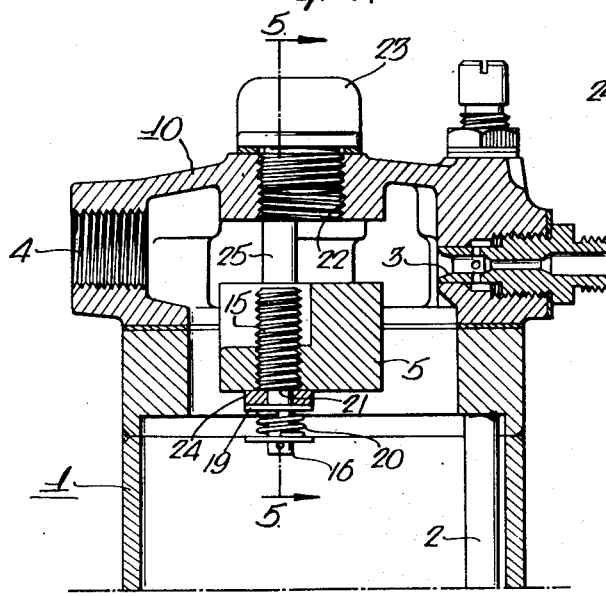

Patented Sept. 16, 1952

2,610,700

UNITED STATES PATENT OFFICE 2,610,700

OIL MIST LUBRICATOR

Karl Evald Andreas Göthberg, Goteborg, Sweden, assignor to Aktiebolaget Svenska Kullagerfabriken, Goteborg, Sweden, a corporation of Sweden Application April 2, 1948, Serial No. 18,590
In Sweden April 11, 1947

9 Claims. (Cl. 183—22)

It has become more and more common to lubricate bearings, gear wheels, cutting tools, etc. with oil mist produced in an oil mist lubricator with the aid of compressed air. Oil mist in its broader sense is a heterogeneous mixture of air and more or less finely divided oil. The smallest particles of oil are so small that they may remain suspended in air for a long time, even if the air is stationary. Together with the air they form pure oil mist which has properties substantially the same as a gas. The larger particles, oil drops, in the oil mist have the properties of liquid oil. They are carried along with the air when it is in rapid rectilinear motion, but only for a very short time. They soon fasten on the walls of the pipes and form a more or less pronounced stream of fluid oil which can sometimes be seen in oil mist systems.

The pure oil mist, which acts as a gas, is distributed among a number of branch ducts in amounts proportionate to the smallest cross sectional areas of these. The liquid oil in the ducts is however distributed according to other laws and it is difficult, not to say impossible, to properly distribute the oil among different points of lubrication. The oil mist which is to be distributed to a number of points through a system of branched ducts emanating from an oil mist lubricator should therefor be as free from liquid oil as possible. An oil mist lubricator which delivers practically pure oil mist can, however, only deliver a certain amount of mist, about 10 grams oil per cubic meter air. The capacity can therefore be increased only by increasing the amount of air, which means increased expense. This would therefore be entirely too expensive for lubricating drilling and broaching tools or for spraying surfaces. For these purposes, in cases in which there are no branch lines, it is therefore usual to design the lubricator so that in addition to pure oil mist it also delivers a quantity of liquid oil. The two different fields of use therefore necessitate two different lubricator designs.

The main purpose of the present invention is to provide an oil mist lubricator which can produce a very pure and therefore economic oil mist and in the second place to provide a lubricator which can be conveniently modified so that it can also be used in cases in which an oil mist is required containing larger quantities of oil than can be obtained through the use of pure oil mist.

The invention relates to oil mist lubricators in which an oil separating member is introduced in the stream of mist between the place of formation of the oil mist and the outlet from the lubricator and is characterized mainly thereby that free passages for the stream of mist are provided at both sides of the separating member. According to a modification of the invention the separating member is entirely or partially removable out of the stream.

Figure 2:
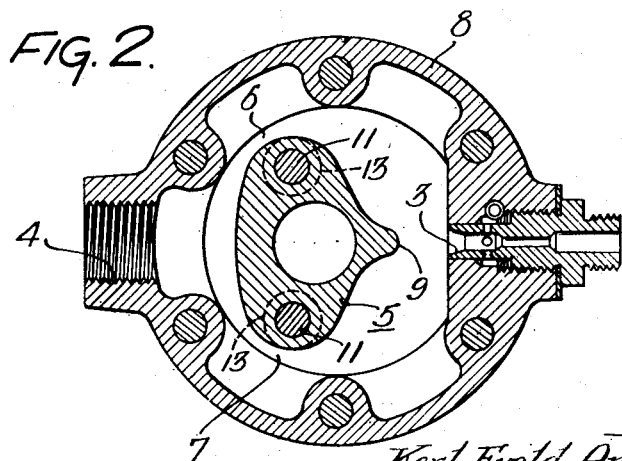

Several embodiments of the invention are shown on the accompanying drawings in which Fig. 1 shows a vertical section through a lubricator for producing a pure mist. Fig. 2 is a section through the lubricator along the line 2—2 of Fig. 1. Fig. 3 is a vertical section through part of a lubricator for producing large quantities of oil and Figs. 4 and 5 show partial sections of an adjusting device for adjusting the lubricator for different uses.

The oil mist lubricator according to Fig. 1 comprises an oil container 1 in which is a suction pipe for oil leading to a nozzle 3. The nozzle 3 is connected to a source of pressure air (not shown) and the mist is formed in a known manner and is carried along by the air jet and escapes through an opening 4 located opposite the nozzle. When the oil mist is formed, it is mixed with drops of oil which may comprise up to 98% of the oil quantity delivered by the apparatus unless special means are employed to separate the oil. According to the invention an oil separating member 5 is located between the place at which the mist is formed, i. e. at the nozzle, and the escape opening 4. As is apparent from Fig. 2 it is in this case shaped like a heart or a plowshare. Channels 6 and 7 are arranged at each side of the member 5 between this member and the surrounding walls of the container. The stream of oil mist which impinges against the member 5 is split into two parts by the forward edge 9 which are diverted to both sides without any considerable shock to prevent oil from being splashed out from the member 5 into the stream of mist and being carried along with the air.

All particles of oil in the stream must either change direction or be thrown against the member 5. The larger particles cannot easily change direction because of their mass and speed and they therefore are caught on the walls of the member 5 and finally drop from the lower edge of the wall. They are then caught by a backward flow of air which forms part of the eddy which is created secondarily in the air chamber under the horizontal stream and are carried back in a direction from the outlet. The drops then fall obliquely back into the oil bath.

The smallest, very minute, particles on the other hand remain suspended in the air and pass together with it along the passages 6 and 7 on each side of the wall as very pure oil mist. Only a small percentage of the oil quantity in the mist is liquid oil and about 98% is very finely divided oil. The purification of the oil mist is therefor very effective.

The member 5 may be made integral with the the cover 10 of the lubricator but may be made separate with advantage. In the latter case it may be made adjustable in the vertical direction as shown in the drawings. In the form of the invention shown in Figs. 1 to 3, the member 5 is fixed to the cover 10 by a pair of bolts 11 and nuts 12. In Fig. 1 the member is shown in its upper position engaging the cover and disposed between the place of formation of the mist and the outlet from the lubricator. A pair of distance pieces 13 and 14 are interposed between the member 5 and the nuts 12. The distance piece 13 is twice as high as the piece 14. By rearranging the distance pieces in a suitable manner so that they are disposed above or below the member 5 this member may be brought to assume three different positions, other than that shown in Fig. 1, where they act to give the most complete separation, so that the escaping oil mist is practically free of larger particles of oil. In the different positions the separating effect is more or less effective. The higher the member is located, the greater will be the proportion of oil drops that will be intercepted and separated from the oil mist in the stream before it leaves the apparatus. In the lower position as shown in Fig. 3, in which both distance pieces are positioned above the separating member, the path of the stream is left free and the separating member has practically no effect on the stream leaving the nozzle and all oil in the stream will consequently continue out through the outlet opening of the apparatus.

An embodiment of the invention in which the position of the member 5 can be adjusted from without is shown in Figs. 4 and 5. In this form the member 5 is slidable along a pair of pins 25 fixed to the cover 10. The pins are connected at their lower ends by a plate 24. The member 5 is in threaded engagement with a screw 15 which has an extension 16. The extension protrudes through an opening in the plate 24 and is provided at its lower end with a washer 17 which is held in place by a split pin 18. A spring 20 is located between the washer 17 and another washer 19 abutting against the plate 24 and causes a shoulder 21 on the screw to be pressed against the upper side of the plate 24. An opening 22 in the cover 10 is located above the screw 15 and is closed by a plug 23. When it is desired to adjust the member 5 it is therefore only necessary to remove the plug 23 after which it is possible to turn the screw 15 with a screwdriver, thereby raising or lowering the member 5 to obtain the desired concentration of oil in the mist.

I claim:

1. In an oil mist lubricating apparatus, a body forming a closed chamber having a filling opening and plug therefor, means to supply a mixture of oil and air to the chamber in a high velocity stream in which some of the oil is in particles of mist size capable of suspension in air while other particles are of larger size incapable of suspension in air, separating means in the chamber including diverging walls transverse to the mixture stream against which the stream impinges and to which the larger particles adhere, means for guiding said separating means for vertical movement, an adjusting screw accessible through the filling opening and cooperating with the separating means to determine its position, and an outlet for the air and oil mist particles located in the chamber out of the direct path of the mixture stream and spaced from the separating means in a position such that oil collected on the separating means will not escape from the chamber through the outlet.

2. The combination set forth in claim 1, in which the stream flows in a generally horizontal direction and in which the wall of the separating means is shaped to have divergent curved surfaces meeting at substantially the vertical center line of the stream.

3. The combination set forth in claim 1, in which the stream flows in a generally horizontal direction and in which the wall of the separating means has a rounded leading edge directed into the stream and has curved diverging surfaces extending beyond the projection of the boundary of the linear portion of the stream.

4. The combination set forth in claim 1, in which the stream flows in a generally horizontal direction and in which the wall of the separating means has a vertical leading edge directed into the stream and has vertical diverging surfaces extending beyond the projection of the boundary of the linear portion of the stream.

5. An oil mist lubricator comprising a housing having a closed chamber, means to supply to the chamber a mixture of oil and air in a rapidly moving stream in which some of the oil is in the form of a mist while the remainder is in the form of larger particles, a separating member in the chamber, adjustable means to position the separating member partly or wholly in the path of the stream, said member having a rounded vertical edge located substantially centrally of the air and oil stream and having divergent curved surfaces extending from the rounded edge to deflect the air and mist for flow around the sides of the member, said member having its lower edge beneath the direct air and oil stream so that oil dripping from the lower edge is retained within the chamber, said surfaces forming a barrier upon which the larger particles collect, and means forming an outlet for the flow of oil mist from the chamber located substantially coaxial with the stream so as to receive the larger oil particles which are not collected by the separating member when the latter is positioned so that it does not intercept completely the mixture stream.

6. In an oil mist lubrication apparatus, a body forming a closed chamber and having axially aligned inlet and outlet openings, means to supply a mixture of oil and air to the chamber through the inlet opening in a high velocity stream in which some of the oil is in particles of mist size capable of suspension in air while other particles are of larger size incapable of suspension in air, separating means in the chamber including a wall intermediate the inlet and outlet and extending transversely of the mixture stream, said wall having two vertical curved surfaces joined by a rounded leading edge against which the stream impinges and to which the larger particles adhere and from which the oil may drain to a space away from the mixture stream, and means for adjusting the position of the wall of the separating means so that all or only a portion of the mixture stream impinges against it.

7. In an oil mist lubrication apparatus, a body forming a closed chamber, means including a nozzle to supply a mixture of oil and air to the chamber in a high velocity stream in which some of the oil is in particles of mist size capable of suspension in air while other particles are of larger size incapable of suspension in air, separating means in the chamber including a wall transverse to the mixture stream against which the stream impinges and to which the larger particles adhere, and an outlet for the air and oil mist particles located in line with the direct path of the mixture stream emitted from the nozzle, said outlet being located on the side of the separating means opposite the nozzle, and means to move the separating means to a position in which a portion only of the mixture stream will impinge against it.

8. An apparatus for supplying an oil mist for a lubricating system comprising, a casing having a chamber forming a reservoir for oil and a separating compartment, an aspirating and atomizing nozzle directed into the separating compartment, means to supply air under pressure to the nozzle, a passageway to convey oil from the reservoir chamber to the nozzle, said casing having an oil mist outlet located substantially in alignment with the axis of the nozzle, a baffle within the compartment extending transversely of the axis of the nozzle in the path of the stream of oil and air mixture discharged thereby, and means to adjust the baffle to a position in which only a part thereof lies in the mixture stream, whereby only some of the larger particles of oil will be discharged through the outlet with the oil mist.

9. In an oil mist lubricating apparatus, a body forming a closed chamber, means in the chamber forming an oil reservoir, imperforate baffle means in the chamber, means adjacent the baffle means to spray oil withdrawn from the reservoir and mixed with air against the baffle means in a high velocity stream, some of the oil being in particles of mist size capable of suspension in air while others are of larger size incapable of suspension in air, the baffle means being formed to divide and deflect the stream through a substantial angle and toward the walls of the chamber, thereby causing the larger oil particles to collect on the surface of the baffle and on the walls of the chamber, said baffle having a surface extending below the high velocity stream to permit oil to drip therefrom to the oil reservoir without having to pass through the high velocity stream and means at the top of the chamber forming an outlet for the air and oil mist particles suspended therein.

KARL EVALD ANDREAS GÖTHBERG.

REFERENCES CITED

The following references are of record in the file of this patent:

UNITED STATES PATENTS

| Number | Name | Date |
| --- | --- | --- |
| 801,384 | Koelkebeck | Oct. 10, 1905 |
| 1,719,254 | Wofford | July 2, 1929 |
| 1,732,123 | Edkens et al. | Oct. 15, 1929 |
| 2,227,278 | Slater | Dec. 31, 1940 |

FOREIGN PATENTS

| Number | Country | Date |
| --- | --- | --- |
| 467,927 | Great Britain | June 25, 1937 |